(12) United States Patent
Saad El Din et al.

(10) Patent No.: US 12,305,846 B1
(45) Date of Patent: May 20, 2025

(54) LIGHTBAR WITH INTEGRATED CAMERA SYSTEM

(71) Applicant: 2468862 Ontario Inc., Windsor (CA)

(72) Inventors: Mouneir Saad El Din, Windsor (CA);
Khalid Saad El Din, Windsor (CA)

(73) Assignee: 2468862 Ontario Inc.

( * ) Notice: Subject to any disclaimer, the term of this patent is extended or adjusted under 35 U.S.C. 154(b) by 0 days.

(21) Appl. No.: 18/765,930

(22) Filed: Jul. 8, 2024

(51) Int. Cl.
| | | |
|---|---|---|
| F21V 33/00 | (2006.01) | |
| B60Q 1/00 | (2006.01) | |
| B60Q 1/24 | (2006.01) | |
| B60Q 1/26 | (2006.01) | |
| F21Y 115/10 | (2016.01) | |
| G02B 5/20 | (2006.01) | |
| H04N 23/11 | (2023.01) | |

(52) U.S. Cl.
CPC ........ *F21V 33/0052* (2013.01); *B60Q 1/0023* (2013.01); *B60Q 1/249* (2022.05); *B60Q 1/2611* (2013.01); *G02B 5/208* (2013.01); *H04N 23/11* (2023.01); *F21Y 2115/10* (2016.08)

(58) Field of Classification Search
CPC ..... B60Q 1/249; B60Q 1/2611; B60Q 1/0023
See application file for complete search history.

(56) References Cited

U.S. PATENT DOCUMENTS

| | | |
|---|---|---|
| 9,002,313 B2 | 4/2015 | Sink et al. |
| 10,124,719 B1 | 11/2018 | Bailey et al. |
| 10,893,175 B2 | 1/2021 | Coleman et al. |
| 11,391,885 B2 | 7/2022 | Yu et al. |
| 11,873,962 B2 | 1/2024 | Mano et al. |
| 2009/0116257 A1 | 5/2009 | Rosemeyer et al. |
| 2012/0256544 A1* | 10/2012 | Salmen ............... B60Q 1/22 315/80 |
| 2016/0097493 A1* | 4/2016 | Anderson ............ G03B 15/03 362/544 |
| 2019/0086773 A1* | 3/2019 | Okamura .......... G02B 27/0006 |
| 2021/0292239 A1 | 9/2021 | Kiyota et al. |
| 2022/0191363 A1 | 6/2022 | Boron et al. |
| 2024/0034200 A1 | 2/2024 | Lee et al. |

(Continued)

FOREIGN PATENT DOCUMENTS

| | | |
|---|---|---|
| DE | 102019131294 B3 | 4/2024 |
| EP | 1548675 B1 | 3/2008 |
| EP | 3700778 B1 | 11/2022 |

(Continued)

OTHER PUBLICATIONS

EESR for European application 24187484.1 dated Dec. 2, 2024.

*Primary Examiner* — William N Harris
(74) *Attorney, Agent, or Firm* — Stratford Group Ltd.

(57) ABSTRACT

A lightbar for an emergency vehicle is provided. The lightbar includes lights and a camera within the same unit. An opaque and hollow cylindrical tube runs from the lens of the camera to an inside surface of the lightbar. The tube prevents IR light that reflects from the inside surface of the lightbar from entering the lens. The tube also prevents IR light and light from LED lights within the lightbar from entering the lens directly. Settings on the camera are set so that image capture is filtered at a frequency of 50 Hz and 60 Hz. By providing such a tube and by filtering out image capture at 50 Hz and 60 Hz, images captured by the camera are greatly improved in quality.

7 Claims, 4 Drawing Sheets

(56) References Cited

U.S. PATENT DOCUMENTS

2024/0210531 A1* 6/2024 Tanemoto ................ G08G 1/16

FOREIGN PATENT DOCUMENTS

| GB | 2553298 A | 3/2018 |
| JP | 2001197337 A | 7/2001 |
| WO | 2007103629 A2 | 9/2007 |
| WO | 2023233150 A1 | 12/2023 |

* cited by examiner

LIGHTBAR WITH INTEGRATED CAMERA SYSTEM

FIELD OF INVENTION

This invention relates to lightbars on emergency vehicles, and more particularly to cameras within such lightbars.

BACKGROUND

Emergency vehicles often have lightbars on the roof of the vehicle. The lightbar is generally in the form of a hollow parallelepiped enclosed by a dome. Within the hollow lightbar are lights which can flash and which are powered by the battery of the vehicle, and nowadays are usually LED lights. Within the hollow space of the lightbar are also many other components necessary to operate the lightbar. An emergency vehicle sometimes also has a camera mounted on the roof for capturing video or still images. For example, a camera on a police vehicle can take an image of a license plate of a stopped or pursued vehicle.

If the emergency vehicle has both a lightbar and a camera, the camera is typically mounted above or on top of the lightbar. This conventional arrangement is for several reasons. First, the structural design of lightbars often lacks the necessary space to incorporate a camera, especially when the camera is an aftermarket addition. Second, and perhaps more importantly, the flashing lights can lead to significant visual interference in the camera's recording, as the intense flashes disrupt the camera's ability to capture clear images. Finally, the mounting the camera externally prevents the lightbar's dome from interfering with infrared light emitted by the camera at night.

However, placing the camera above or on top of the lightbar compromises the aerodynamic properties of the vehicle. While this might seem like a minor concern, this arrangement can impact fuel efficiency and handling of the vehicle at high speeds. Additionally, placement of the camera above the lightbar can detract from the visual sleekness of the vehicle, which plays a crucial role in establishing authority and respect from the general public.

A way of integrating a camera within the lightbar which did not allow interference from the lights would improve the aerodynamic and aesthetic properties of the emergency vehicle, while still maintaining the functional capabilities of both the lightbar and the camera.

SUMMARY

According to one embodiment of the invention, a lightbar for use on an emergency vehicle is provided. The lightbar includes a dome enclosing a hollow space, which contains at least one LED light and a camera. The camera includes a cylindrical tube running from a lens of the camera to the dome, the tube being open at both ends and having opaque walls. An end of the tube away from the lens is flush with an inside surface of the dome. The camera also includes an infrared light (IR) emitter.

In one embodiment of the invention, the camera has adjustable settings set to filter images captured by the camera at at least one frequency in the range of 50 Hz to 60 Hz. In yet another embodiment filtering occurs at both 50 Hz and 60 Hz.

By shielding the camera lens from ambient light and reflections of IR, image quality can be improved. A lightbar containing both flashing LED lights and a camera including an IR emitter can be provided. The tube running continuously from the camera lens to the inside surface of the dome prevents direct interference from light from the flashing LEDs from entering the camera directly, from IR light from the IR emitter from entering the camera directly, and from IR light from the IR emitters that reflects from the inside surface of the lightbar dome from entering the camera. Image quality can be further improved by filtering out images at 50 Hz and 60 Hz, and by using the camera's chipset to adjust image quality.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
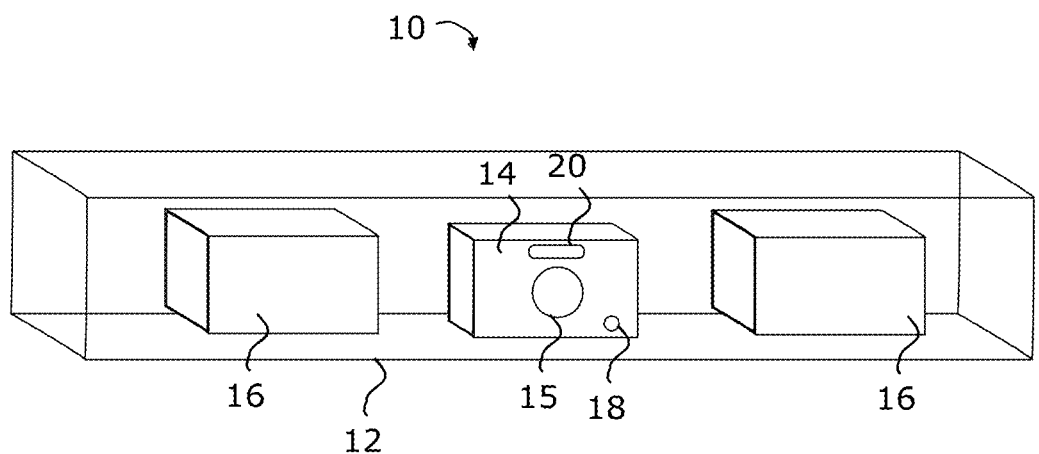
FIG. 1 shows a lightbar according to one embodiment of the invention.

Referring to FIG. 1, a lightbar is shown according to one embodiment of the invention. The lightbar 10 can be mounted on the roof of an emergency vehicle. The lightbar 10 is a hollow space encased in a transparent dome 12. The lightbar 10 includes a plurality of brackets (not shown in FIG. 1) in the hollow space onto which at least one light emitting diode (LED) module 16 is mounted. Two LED modules 16 are shown in FIG. 1, though more generally there is at least one. Each LED module includes an LED light capable of emitting bright flashing light. The lightbar 10 also includes a plurality of brackets in the hollow space onto which a camera 14 is mounted. The camera 14 includes a lens 15 on a front face of the camera 14 through which light from an object to be imaged passes. The camera 14 also includes a light sensor 18 and an infrared light (IR) emitter 20. The IR emitter 20 illuminates a target with IR light when the light level sensor 18 indicates low light conditions.

Although only one camera 14 is shown in FIG. 1 and the camera is pointing towards the front of the lightbar, more generally there is at least one camera, each of which may point in any direction. The usual arrangement of cameras within the lightbar is to have one camera pointing directly forward, but there may also be additional cameras pointing generally forward but angled away from pointing directly forward, for example to capture images in lanes adjacent to that in which the emergency vehicle is travelling, or to capture images on a road if the emergency vehicle is pulled off to a shoulder of the road. One or more of the at least one camera 14 may even be pointing towards the rear of the vehicle.

Figure 2:
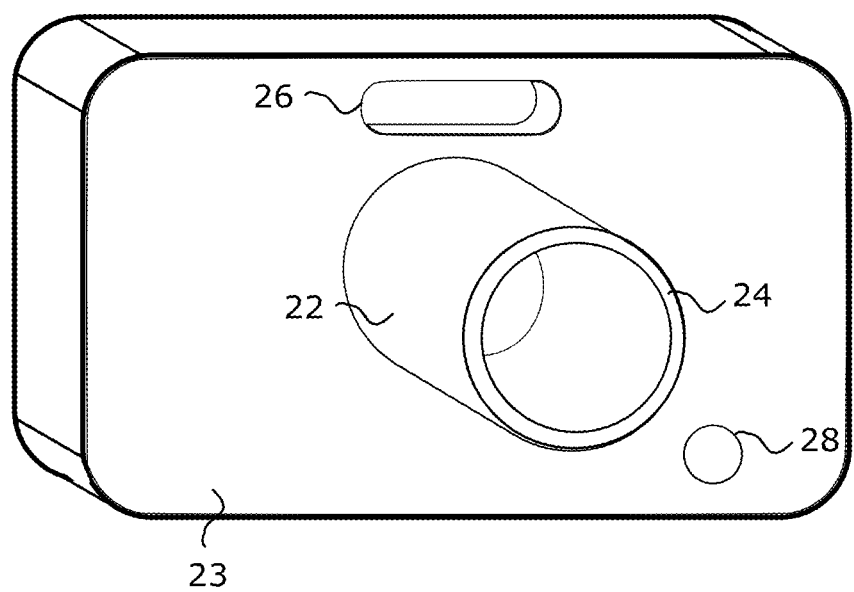
FIG. 2 shows a front perspective view of an enclosure for the camera of FIG. 1 according to one embodiment of the invention.

Referring to FIG. 2, a front perspective view of an enclosure that forms part of the camera 14 of FIG. 1 is shown according to one embodiment of the invention. The enclosure includes a generally cylindrical tube 22 extending out from a front surface 23 of the enclosure. The tube 22 is open at both ends, but the wall of the cylinder is opaque. The axis of the tube 22 is perpendicular to the front surface 23. The end 24 of the tube away from the front surface 23 may be at an angle relative to the plane perpendicular to the axis of the tube, as explained below.

The enclosure also includes an IR emitter aperture 26 sized to accommodate an IR emitter, and a light sensor recess 28 sized to accommodate a light sensor.

Figure 3:
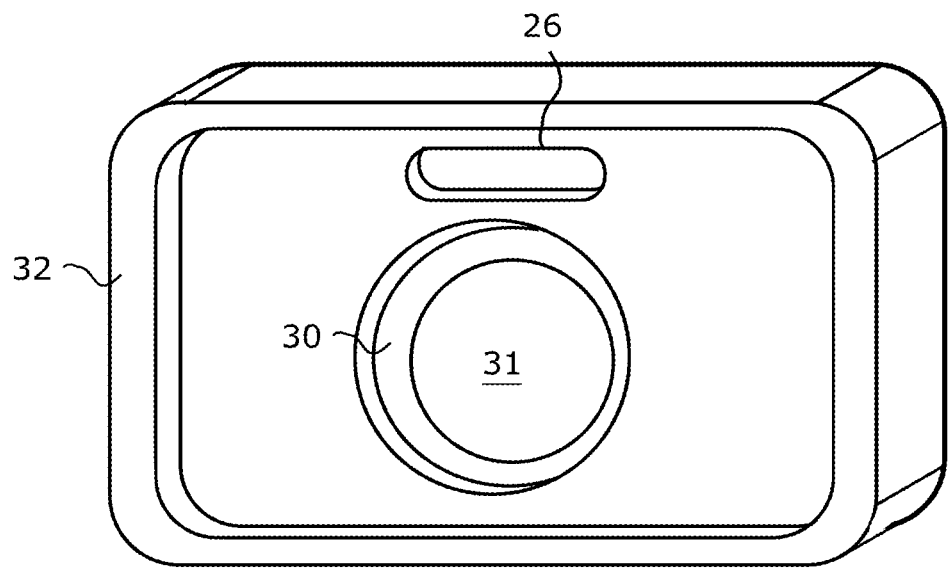
FIG. 3 shows a rear perspective view of the enclosure of FIG. 2 according to one embodiment of the invention.
Figure 4A:
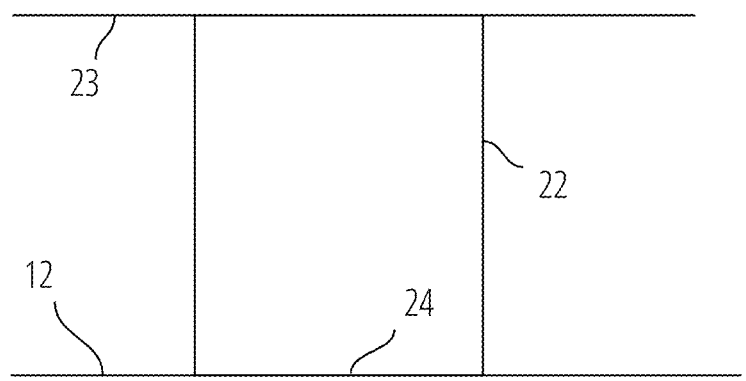
FIG. 4A shows a top view of an end of a tube abutting the inside surface of a dome perpendicularly.
Figure 4B:
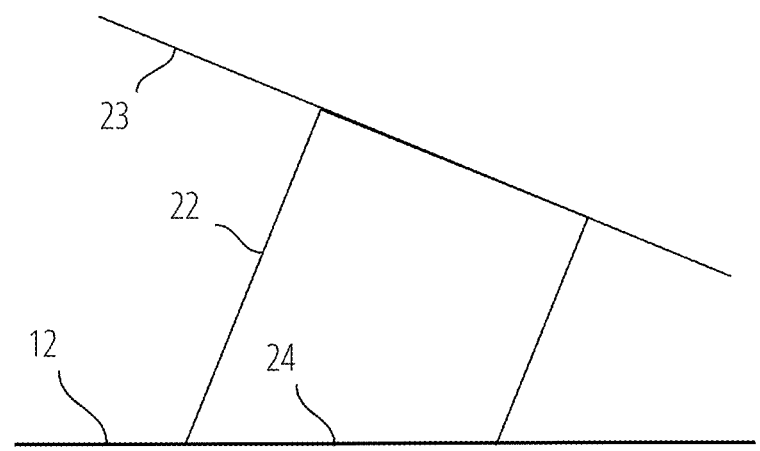
FIG. 4B shows the same but at an angle different from perpendicular.

When the enclosure is placed within a lightbar, the end 24 of the tube away from the front surface 23 is angled and abuts an inside surface of the dome 12. The end 24 of the tube 22 abutting the inside surface of the dome is angled so that the entire end 24 of the tube is flush with the inside surface of the dome 12. The angle of the end 24 of the tube relative to the axis of the cylindrical tube 22 will depend on the shape of the dome 12, and in fact may be perpendicular to the axis of the tube 22 if the face of the dome 12 facing the front of the vehicle is vertical and the camera 14 is facing directly forward. If the camera 14 is not facing directly forward, as would be the case if the camera 14 was only one of a set and this particular camera was angled to the side relative to the front of the vehicle so as to capture images of a different road lane, then the angle of the end 24 of the tube is different from perpendicular to the axis of the tube so that the end 24 of the tube is flush with the interior surface of the dome Referring to FIG. 3, a rear perspective view of the enclosure is shown according to one embodiment of the invention. The enclosure includes on its rear face a circular recess 30 sized to accommodate a camera lens. Other than an annular flange around the inside of the circular recess 30 and closest to the front surface, the circular recess 30 is open at the end closest to the front surface, forming a circular aperture 31. If a lens that is substantially the same size as the circular recess 30 is placed within the circular recess 30 then the annular flange prevents the lens from passing through the circular aperture 31. The circular aperture 31 leads to the tube 22, such that light entering the tube 22 through the end 24 of the tube passes along the tube 22, through the circular aperture 31, and through any lens placed within the circular recess 30. The side walls 32 of the enclosure extend back from the front surface of the enclosure so as to create a generally rectangular recess at the rear of the enclosure, though the precise shape will depend partly on the shape of the enclosure.

The IR emitter aperture 26 and the light sensor aperture 28 are shown in the figures as being above and below the tube 22, respectively. The precise location of the IR emitter aperture 26 and the light sensor aperture 28 is not important, and in fact their positions can be exchanged, as long as they are both directed generally in the same direction as that in which the tube 22 extends from the rest of the enclosure.

The enclosure is sized to fit inside a lightbar. The shape of the enclosure along with the presence of the various apertures and recesses allow camera components to be placed within the enclosure in such a way that the camera can be assembled so as to be compact enough to fit inside a lightbar.

The camera 14 is assembled by placing an IR emitter within the IR emitter aperture 26, a light sensor within the light sensor aperture 28, and a lens within the circular recess 30. Additional elements required by the camera are placed within the generally rectangular recess formed by the sidewalls 32 and the front surface of the enclosure, such as a camera sensor a camera processor, and a power module of the camera. When the camera 14 is assembled and mounted inside a lightbar, the tube 22 provides a continuous and enclosed passage from the lens 15 to an inside surface of the dome 12.

Settings on the camera are set so as to prevent the camera from capturing images of a video image at frequencies of 50 Hz and 60 Hz. When these settings are set, the electronic shutter speed of the camera is synchronized with these frequencies. A continuous, always-on filtering technique is implemented to specifically address and mitigate flicker and distortion caused by the LED lights within the lightbar. Flickering is a common problem with LED lights due to the use of pulse wave modulation by the LED driver used to control the LED. The filtering at 50 Hz and 60 Hz is important for maintaining clear and stable video output in environments where the camera is in close proximity to LED lighting. The camera incorporates a digital filter as part of the camera's digital signal processing suite. The filter is permanently active, processing every frame to detect and attenuate these specific frequencies. By focusing on these frequencies, the filter effectively reduces the visual disturbances caused by the flashing of the LED lights in the lightbar. The constant application of the filter ensures that the flicker does not translate into the captured video, thereby avoiding common issues like fluctuating brightness or wavy patterns which can degrade the image quality. By impacting only the interference at the targeted frequencies, the filtering does not affect the overall luminance and colour accuracy of the video, and ensures that the video quality remains high with true-to-life colours and clear visibility, important for accurately assessing scenes captured by the camera.

The camera is equipped with an AI chipset that can be programmed to automatically adjust settings of the camera so as to improve the quality of captured images. When programmed, the chipset automatically adjusts the ISO, the exposure, the brightness, the focus, and the shutter speed in real time so as to obtain clear images. For example, if the chipset determines that captured images would be too dark to be useful, the adjustable settings of the camera are adjusted so that the captured images will be brighter.

In operation, the camera 14 captures images in front of the emergency vehicle. When the light level sensor indicates low light conditions the IR emitter emits IR so as to illuminate objects in front of the emergency vehicle. This allows the camera to capture images even in low light conditions. The tube 22 prevents IR from the IR emitter from entering the camera lens directly. Since the end 24 of the tube is flush with the inside surface of the dome the tube 22 also prevents IR that reflects off the inside surface of the dome from entering the camera lens. Only IR light that enters the lightbar from outside the dome can reach the lens. The tube 22 also prevents light from the at least one LED module 16 from entering the lens directly.

Filtering out the frequencies of 50 Hz and 60 Hz in the images captured by the camera 14 prevents interference from the LED modules 16, which operate at these frequencies. Without this filtering, light emitted by the LED modules 16 could dominate the captured images at these frequencies and there could be significant degradation of image quality.

The invention has been described as setting the settings within the AI chipset so as to improve image quality. While desirable, this is not strictly necessary. The presence of the tube 22 and filtering of images at 50 Hz and 60 Hz may be enough to produce images or video that are usable.

The invention has been described with camera settings adjusted to filter out images at both 50 Hz and 60 Hz. However, since the frequency of LED flickering can depend on the environment in which the LED lights and LED drivers are manufactured or operate, the invention may also provide advantages if filtering only occurs at one of these frequencies, the choice of which frequency to filter out depending on the environment in which the LED lights operate. More generally, the camera's settings are set to filter out at least one frequency within the range of 50 Hz to 60 Hz. However, setting the camera's settings to filter out both frequencies allows greatest flexibility in the use of a single system, as it accounts for flickering regardless of environment.

In an alternative embodiment, there is no filtering of the images.

The embodiments presented are exemplary only and persons skilled in the art would appreciate that variations to the embodiments described above may be made without departing from the spirit of the invention. The scope of the invention is solely defined by the appended claims.

We claim:

1. A lightbar for use on an emergency vehicle, the lightbar comprising:
    a transparent dome enclosing:
        at least one LED light; and
        at least one camera comprising:
            a light sensor configured to detect low light conditions;
            an infrared light (IR) emitter configured to project IR light upon low light conditions being detected; and
            a cylindrical tube having a first opening positioned away from an interior surface of the transparent dome coupled to a lens, a second opening, opposite the first opening, and opaque walls, the cylindrical tube configured to prevent light, originating from the at least one LED light and the IR emitter and reflected off the surface of the dome, from entering the lens.

2. The lightbar of claim 1 wherein the second opening of the tube away from the first opening is flush with the inside surface of the dome.

3. The lightbar of claim 2 wherein the second opening of the tube is flush with the inside surface of the dome at an angle other than a 90° degrees with respect to an axis of the tube.

4. The lightbar of claim 1 wherein the camera has adjustable settings set to filter images captured by the camera at least one frequency in a range of 50 Hz to 60 Hz.

5. The lightbar of claim 4 wherein the adjustable settings are set to filter images captured by the camera at frequencies of both 50 Hz and 60 Hz.

6. The lightbar of claim 2 wherein the camera has adjustable settings set to filter images captured by the camera at at least one frequency in a range of 50 Hz to 60 Hz.

7. The lightbar of claim 6 wherein the adjustable settings are set to filter images captured by the camera at frequencies of both 50 Hz and 60 Hz.

* * * * *